March 18, 1924. 1,486,941

H. F. WOERNLEY

FRICTION DRAFT GEAR

Filed April 15, 1922

INVENTOR
HARRY F. WOERNLEY
BY *Wm. M. Cady*
ATTORNEY

Patented Mar. 18, 1924.

1,486,941

UNITED STATES PATENT OFFICE.

HARRY F. WOERNLEY, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT GEAR.

Application filed April 15, 1922. Serial No. 553,092.

*To all whom it may concern:*

Be it known that I, HARRY F. WOERNLEY, a citizen of the United States, residing at Wilkinsburg, in the county of Allegheny and State of Pennsylvania, have invented new and useful Improvements in Friction Draft Gears, of which the following is a specification.

This invention relates to friction draft gear for railway cars, and more particularly to the type employing alternate relatively fixed and longitudinally movable friction plates.

The principal object of my invention is to provide an improved friction draft gear of the above type.

Figure 1:
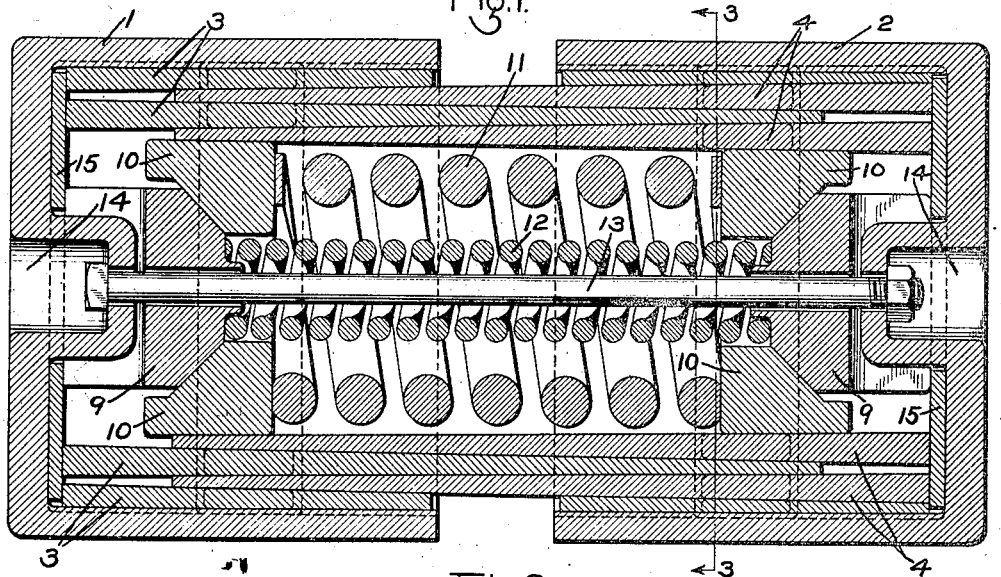
Figure 2:
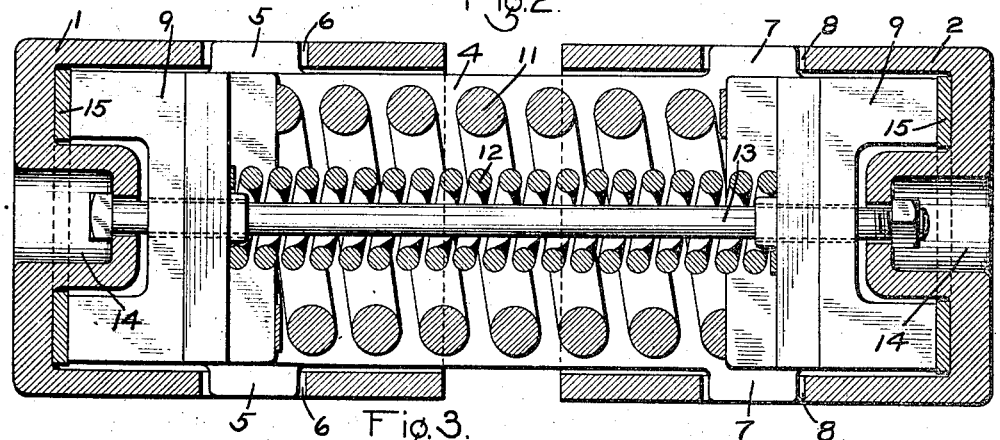
Figure 3:
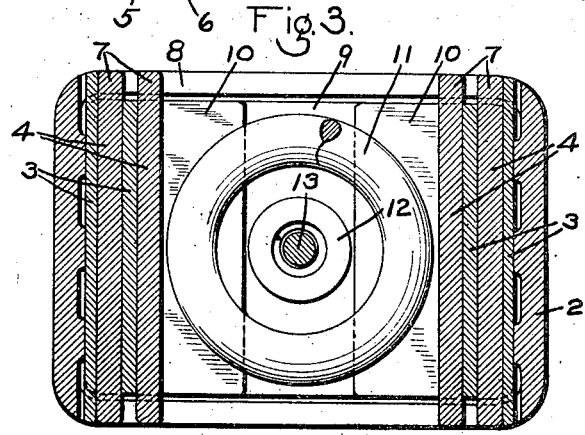

In the accompanying drawing; Fig. 1 is a longitudinal section of a friction draft gear embodying my invention; Fig. 2 a longitudinal section of the draft gear on a plane at right angles to that of Fig. 1; and Fig. 3 a section on the line 3—3 of Fig. 1.

As shown in the drawing, the draft gear may comprise counterpart housings 1 and 2, each having a closed end and an open end facing the open end of the counterpart housing. Within the housings are mounted groups of wedge shaped or longitudinally tapered friction plates, alternate friction plates 3 being disposed with the large ends engaging the end wall of the housing 1, while the large ends of the friction plates 4 engage the end wall of the housing 2. The friction plates 3 are anchored to the housing 1 by means of lugs 5 which extend into slots 6 formed in the opposite side walls of the housing and similarly, the plates 4 are anchored to the housing 2 by means of lugs 7 which extend into slots 8 formed in the opposite side walls of the housing 2.

The outer friction plates 3, which engage the walls of the housings, may be cut away at the central portion and both half sections of each friction plate may be anchored to the corresponding housing, so that these plates serve as wear plates and prevent wear on the housing which would otherwise occur through relative longitudinal movement of the friction plates when the draft gear is in action.

Interposed between the opposite groups of alternate friction plates are a pair of laterally wedging mechanisms, each comprising a central wedge block 9 having oppositely inclined friction or wedging faces adapted to engage corresponding wedging faces of wedge blocks 10. The wedge blocks 10 have friction faces engaging the adjacent friction faces of the adjacent friction plates 4 and interposed between the opposite pairs of wedge blocks 10 is a coil spring 11. A coil spring 12 is also interposed between the opposite central wedge blocks 9.

The housings and the included friction elements are held together as a unit by means of a centrally mounted tie bolt 13, the head and the nut of the tie bolt being positioned in pockets 14 formed centrally of the housings 1 and 2.

When the draft gear is subjected either to a buffing or draft stress, one or the other of the housings is moved toward the other, which remains stationary. This movement causes both central wedge blocks to exert a lateral pressure on the wedge blocks 10, which is transmitted to the friction plates 3 and 4. At the same time, a relative longitudinal movement takes place with respect to the friction plates 3 and 4, so that friction is set up by the sliding of the friction plates on each other and since the plates are wedge shaped or tapered, an additional lateral wedging action is produced by the friction plates which increases with the extent of the longitudinal movement.

The use of wedge shaped friction plates also facilitates the release, since the plates tend to fall away from each other as the housings separate in the release movement.

Wear plates 15 may be interposed between the ends of the plates 3 and 4 and the housings 1 and 2, so as to prevent wear on the housings by engagement of the ends of the friction plates therewith and these plates may readily be renewed if the plate should become worn.

Having now described my invention, what I claim as new and desire to secure by Letters Patent:—

1. In a friction draft gear, the combination with counterpart housings having opposed closed ends and facing open ends, of a plurality of alternated longitudinal wedge shaped friction plates mounted in said housings and means for impressing a lateral pressure on said plates.

2. In a friction draft gear, the combination with counterpart housings having opposed closed ends and facing open ends, of a plurality of wedge shaped friction plates mounted in said housings with the large ends of alternate plates adjacent to the small ends of the other plates and means for impressing a lateral pressure on said plates.

3. In a friction draft gear, the combination with counterpart housings having opposed closed ends and facing open ends, of a plurality of wedge shaped friction plates mounted in said housings with the large ends of alternate plates extending into one housing and the large ends of the other plates extending into the other housing and wedging means for impressing a lateral pressure on said plates.

4. In a friction draft gear, the combination with counterpart housings having opposed closed ends and facing open ends, of a plurality of wedge shaped friction plates mounted in said housings, with the large ends of alternate plates engaging the closed end of one housing and the large ends of the other plates engaging the closed end of the other housing and wedging means for impressing lateral pressure on said plates.

5. In a friction draft gear, the combination with counterpart housings having opposed closed ends and facing open ends, of a plurality of wedge shaped friction plates mounted in said housings with alternate plates anchored to one housing and the other plates anchored to the other housing and means for impressing a lateral pressure on said plates.

In testimony whereof I have hereunto set my hand.

HARRY F. WOERNLEY.